April 19, 1955 H. FRANKEL ET AL 2,706,429
STEREOSCOPIC TRANSPARENCY VIEWER

Filed Dec. 10, 1952 2 Sheets-Sheet 1

INVENTORS
HUGH FRANKEL
HENRY FINKEL
BY *Alan Ausubel*
ATTORNEYS

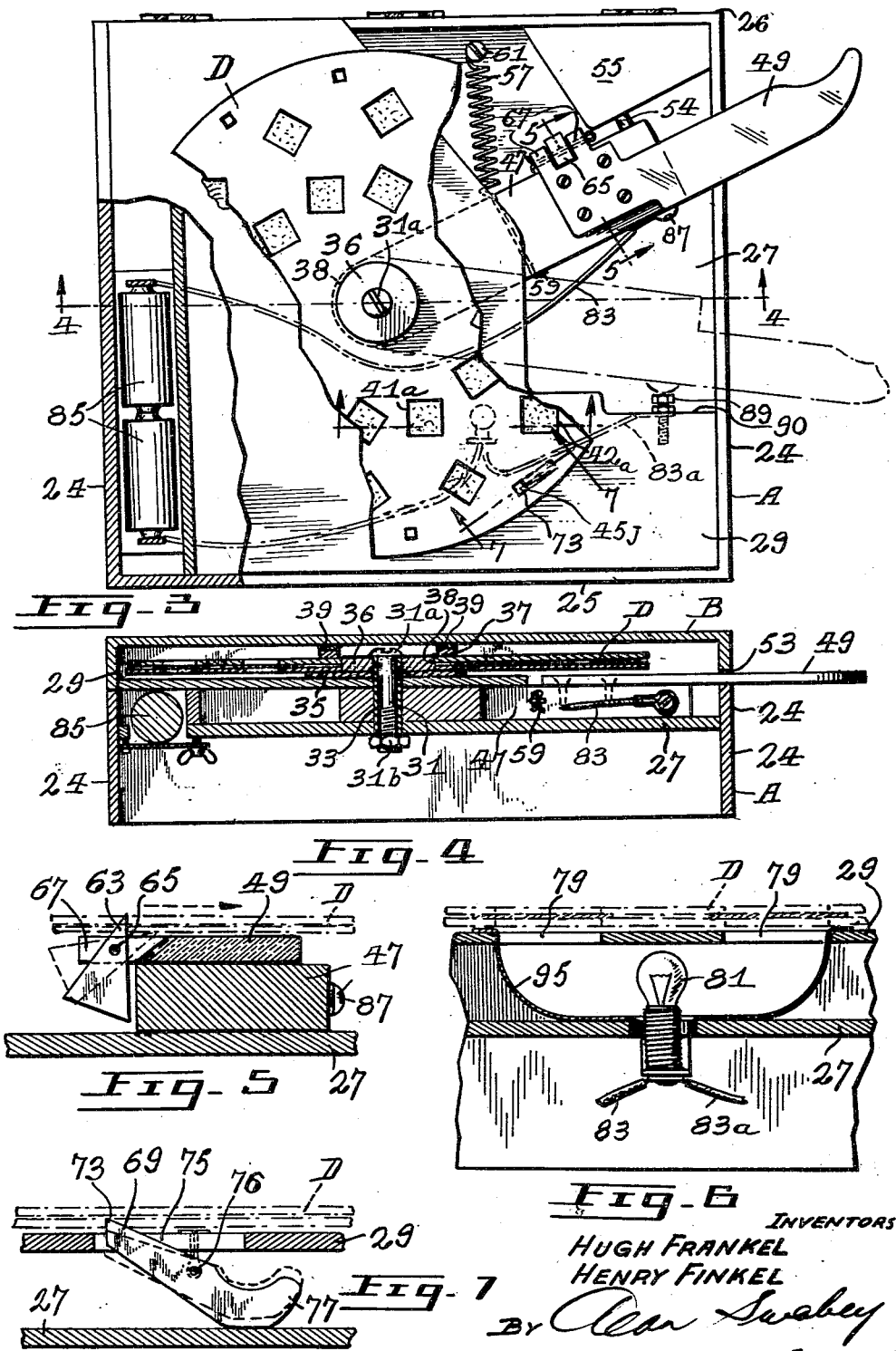

United States Patent Office 2,706,429
Patented Apr. 19, 1955

2,706,429

STEREOSCOPIC TRANSPARENCY VIEWER

Hugh Frankel and Henry Finkel, Montreal, Quebec, Canada

Application December 10, 1952, Serial No. 325,056

6 Claims. (Cl. 88—31)

This invention relates to a stereoscopic viewing device. The invention falls in the general field of United States Patent 2,189,285, Gruber, February 6, 1940, covering a stereoscopic viewing device which has become well known under the trade-mark name "View Master" and of the devices shown in German Patent 683,292 and Italian Patent 459,113, in which the two views of each pair making up the stereoscopic subject fall on the same side of the axis of the viewing disc.

The applicant's device provides improved transport mechanism for rotating the disc and other features as will become apparent from the following.

The invention is embodied in a viewing apparatus which includes a disc having a plurality of pairs of windows about its centre with both openings in each pair at the same side of the centre. Viewing means is provided for viewing each pair of openings simultaneously. Transport means is also embodied in the device for moving the disc to expose to the viewing means in immediate succession successive pairs of the viewing openings whereby a cycle of views can be shown in repeated succession. All the pairs of openings are at the same inclination to the centre of the disc so that they register with the viewing openings when the disc is turned so that the pair to be viewed falls on the chord of the disc registering with the viewing openings.

The working parts of the apparatus are preferably housed in a cabinet, desirably having a top which is designed to be in a sloping position downwards away from the person using it. Preferably the housing includes a base member and a spindle standing upwards from the base member and retaining the viewer disc. A transport lever, in this arrangement, is pivotally mounted on the spindle beneath the disc. The lever has a catch adapted to engage catch means on the disc. A spring is normally adapted to hold the lever in position. The lever has a handle projection beyond the casing. The handle is movable from retracted position to a terminal position so that with each stroke of the lever the disc is moved forward the distance between successive pairs of viewing openings. A catch member is provided to engage one of the catch members on the disc, thereby to prevent the disc from moving in reverse direction when the lever is allowed to return to rest position.

In a preferred arrangement, the cover of the casing includes viewing openings having lenses and through the lenses are visible a pair of disc viewing openings when the disc is in lever-terminal position. Preferably, there is a lighting arrangement beneath the disc which lights the transparencies in the pair of openings beneath the viewing opening. The light is preferably turned on and off by movement of the lever.

Detailed description

The invention will be understood in more detail by reference to the accompanying drawings, which illustrate a preferred embodiment of it, and in which:

Figure 3 is a plan view of the apparatus of the previous figures partly cut away to show the mechanism of the apparatus shown in Figures 1 and 2 and with the cover removed.

Figure 4 is a vertical cross section along the line 4—4 of Figure 3, but with the cover in place.

Figure 5 is a cross section along the line 5—5 of Figure 3.

Figure 6 is a cross section along the line 6—6 of Figure 3.

Figure 7 is a cross section along the line 7—7 of Figure 3.

General arrangement

Figure 1:
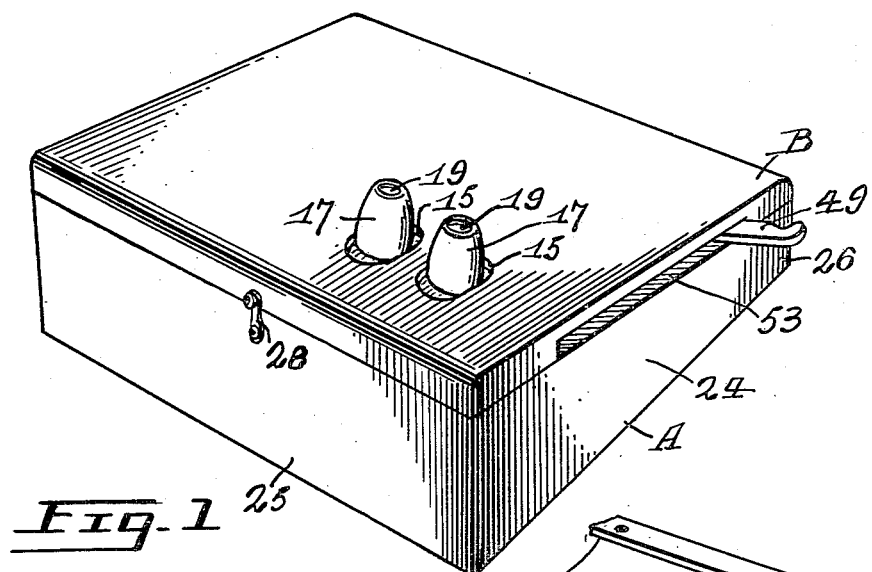
Figure 1 illustrates in perspective the outside of the cabinet of this preferred embodiment, the cover being shown in closed position.
Figure 2:
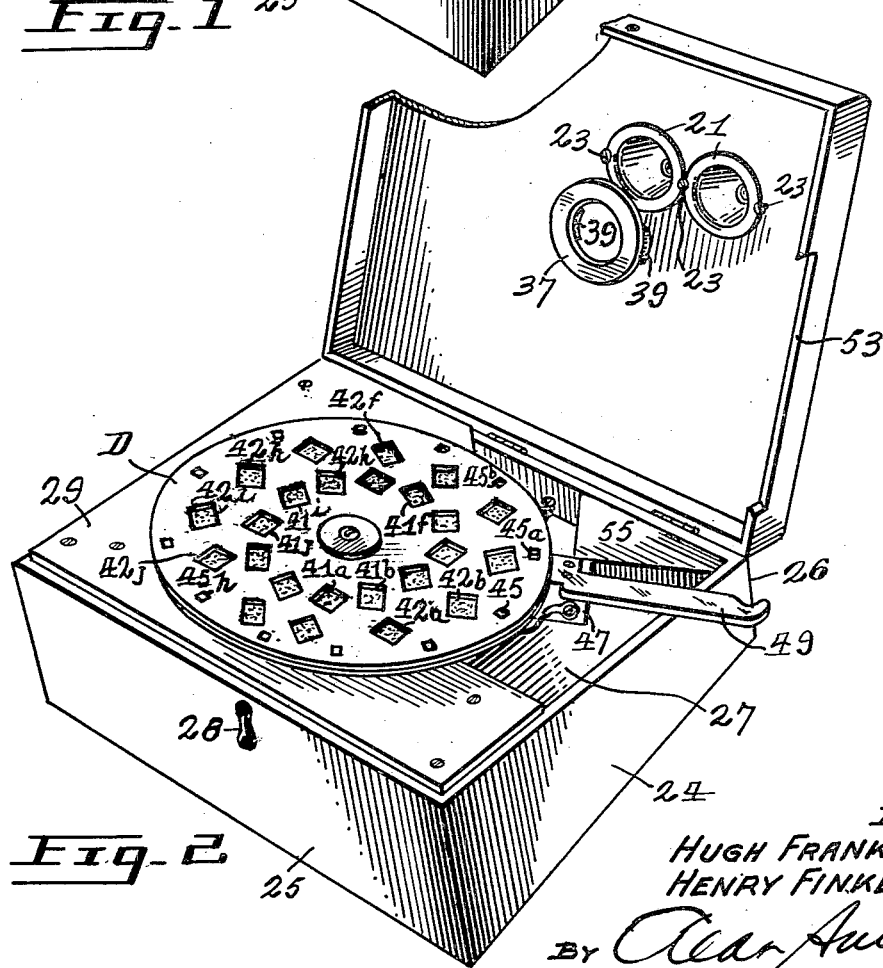
Figure 2 illustrates the cabinet of Figure 1 in perspective, the cover being shown in open position.

Referring more particularly to the drawings, the preferred apparatus is made up as follows. A cabinet is made up of a body part A and a cover part B. The cover A has openings 15 in which are mounted viewing cones 17, each provided with a magnifying lens 19. The viewing cones are held to the underside of the cover by flanges 21 and engaged by screws 23.

The body portion A is so fashioned as to be higher at its front face 25 than at its rear face 26. The cover B includes downwardly extending side flanges 24 of substantially equal height mounted on the sloping body A, so that it slopes from the end 25 to the end 26 as shown. This has been found to improve its viewing position.

Within the body A and spaced downward somewhat from the top is a body member or base panel 28 which slopes parallel to the cover piece. The panel 28 is held in place in any suitable manner, for example, by gluing to the sides 24 of the body A. Upwardly spaced from the panel 28 is a mounting panel 29 which is also parallel to the panel 28 and thus diagonally arranged to the base of the body. Extending between the panels 28 and 29 and centrally of the body A is a spindle member which is made up of a bolt 31 having a head 31a, a nut 31b and surrounding the bolt, a sleeve 33.

Mounted on the sleeve 33 and beneath the head 31a is a separator member comprising a pair of concentric discs 35 and 36, the disc 35 projecting outwards beyond the disc 36. These disc members are preferably integral, thus forming a unit.

Mounted on the disc 36 as a journal is a viewer disc D which has an opening 38 accommodating in a sliding fit the disc 36. The cover has a somewhat doughnut-shaped member 37 which is held to the cover by sponge rubber spacers 39. This doughnut member 37 is adapted to surround the disc 36 above the viewer disc D thus, when the cover is closed, preventing the viewer disc from upward movement and holding it in place, but still allowing it free rotation.

The viewer disc

The viewer disc D is provided with a plurality of pairs of viewing windows 41a, 42a, 41b, 42b, etc. These pairs of viewing windows are each adapted to hold a pair of transparencies being the same view taken from a different angle for the three-dimensional effect. The pairs are so arranged that both windows of each pair are on one side of the centre of the disc. The separate pairs are so arranged that each pair is adapted to register with the viewing cones 17 when the disc is rotated so that they can be brought into register in succession. In the preferred form shown, one window of each pair falls within the area between the preceding pair, that is to say, a line drawn across the top of the preceding pair would intersect the left-hand window of the succeeding pair. This is a convenient but optional arrangement.

The disc is also provided with a number of catch members, in this case, openings 45, 45a, etc., preferably spaced apart adjacent to its periphery. These openings are spaced apart in a peripheral direction the same distance apart as the pairs of viewing openings.

Transport mechanism

Pivoted to the axis member 33 is a transport lever 47, this lever being located between the base panel 27 and the mounting panel 29. This lever includes a part 47 which lies within the housing and handle part 49 bolted to it as at 51 which extends outward through a slot 53 formed in the underside of the edge of the cover B. The part 47 is also provided with a stop member or stud 54 which is adapted in retracted position to engage a stop block 55. The lever is normally held in retracted position by a spring 57 which engages a bolt 59 in the part 47 and a screw 61 in the mounting board or panel 27.

As best shown in Figure 5, the part 49 includes a catch member 63. This catch member is a triangular piece of material pivoted near one angle to a pin 65 which extends through projecting parallel fingers 67 forming therebetween a groove to accommodate the member 63.

Mounted in the mounting panel 29 is another catch member 69 which is pivoted to a pin 76 to the panel 29. This catch member includes a catch portion or pawl part 73 which projects upwards through an opening 75 in the mounting panel 29 and has a downwardly extending or weighting portion 77 which normally keeps the part 73 in the upwards position.

The mounting panel 29 also includes a pair of openings 79 which are adapted to register with the viewing openings when they are in viewing position. Beneath the openings 79 is a lamp 81 fed by electric wires 83 which lead to batteries 85. One of the wires 83 leads to a contact 87 on the lever arm 47, the other wire 83a leads to a contact 89 on a block member 90 beneath the panel 29. Connected to the mounting panel 29 and located beneath the openings 79 is a reflector 95, preferably of metal and painted white.

Operation

For operation, pairs of transparencies are mounted in the disc viewing openings and the cover B is closed and held in place by the catch 26.

The lever 49 is pulled forward from the rest position shown in full line in Figure 3 to the terminal position shown in dotted lines in Figure 3. At the terminal position, the lever is stopped by the contact 87 coming into contact with the contact 89. As the lever is moved forward, the catch member 67 engages in one of the openings 45, 45a, etc., and moves the viewing disc D forward. When the lever 49 reaches the terminal position, a pair of viewer openings, for example, 41a, 42a, will be located directly beneath the viewing openings in the cover B. And, contact between the contact 87 and 89 will light the light 81. The lever may be released and the catch 73 engaging in one of the openings 45, 45a, etc., will prevent counter rotation of the disc D, while the lever moves back to rest position.

Conditions are thus right for viewing the pair of transparencies beneath the viewing openings. When that pair has been viewed, the next pair can be moved into viewing position by merely moving the transport lever 49 again to the terminal position and so on.

We claim:

1. An apparatus of the type described, comprising, a casing, a base member in said casing, a spindle extending upwards from said base member, a viewer disc mounted on said spindle for rotation thereabout, a plurality of pairs of viewing openings in the disc, each pair of openings being arranged at the same side of the spindle, a transport lever pivotally mounted on the spindle beneath said disc, the disc having a plurality of catch-openings adjacent to the periphery thereof, the lever having a catch adapted to engage in one of said catch-openings, a spring attached to said lever and to said base member adapted normally to hold the lever in a retracted position, said lever having a handle projecting beyond said casing, the handle being movable from said retracted position to a terminal position whereby the disc is moved forward the distance between successive pairs of windows, a mounting panel based on said base member and arranged just beneath said disc, a catch member on said mounting panel adapted to engage in one of said catch-openings thereby to prevent the disc from moving in reverse direction, said casing including a cover member adapted to overlie said disc, a pair of viewing openings in the cover member adapted to register with said pairs of windows when the disc is in lever terminal position, a lighting opening in said mounting panel directly beneath said viewing openings, a lamp in said lighting opening, a circuit feeding said lamp, a switch mechanism associated with said lever whereby when said lever is in said terminal position, said lamp is lighted.

2. An apparatus, according to claim 1, in which said base member and said mounting panel are sloping from the horizontal and said cover member is also sloping, the viewing window in said cover member being located towards the higher end of the sloping cover, whereby the viewer is viewed from the side adjacent to the higher end.

3. An apparatus of the type described, comprising, a casing, a base member in said casing, a spindle extending upwards from said base member, a viewer disc mounted on said spindle for rotation thereabout, a plurality of pairs of viewing openings in the disc, each pair of openings being arranged at the same side of the spindle, a transport lever pivotally mounted on the spindle beneath said disc, the disc having a plurality of catch members, the lever having a catch adapted to engage said catch members, means adapted normally to hold the lever in a retracted position, said lever having a handle projecting beyond said casing, the handle being movable from said retracted position to a terminal position whereby the disc is advanced forward the distance between successive pairs of windows, a mounting panel based on said base member and arranged just beneath said disc, a catch member on said mounting panel adapted to engage said catch members thereby to prevent the disc from moving in reverse direction, said casing including a cover member adapted to overlie said disc, a pair of viewing openings in the cover member adapted to register with said pairs of windows when the disc is in lever-terminal position, means for lighting the operative viewing openings operably by the movement of said lever.

4. A device of the type described, comprising a viewing disc having a plurality of pairs of apertures formed therein about the center thereof, the apertures of each pair being at the same side of the center of the disc, means for viewing the pairs of transparencies mounted in the pairs of openings successively in sequence, the disc also having a number of catch-openings adjacent to the periphery thereof, one catch-opening for each pair of viewing openings, a transport mechanism including a lever having a catch adapted to engage in said catch-openings, means normally holding the lever in a retracted position, the lever being adapted to be drawn from a retracted position to a terminal position and means for halting the movement of the lever at the terminal position, a catch acting independently of said lever adapted to engage in said catch-openings to prevent reverse rotation of said disc, lighting means beneath said disc in a position to light the apertures beneath said viewing openings and means operable by the movement of said transport lever to light said illuminating means when the viewing windows are in register with the viewing openings.

5. An apparatus of the type described, comprising a casing, a base member in said casing, a spindle extending upwards, from said base member, a viewer disc mounted on said spindle for rotation thereabout, a plurality of pairs of viewing openings in the disc, each pair of openings being arranged at the same side of the spindle, a transport lever pivotally mounted on the spindle beneath said disc, for horizontal rotary movement, the disc having a plurality of openings, the lever including a body having a pair of spaced-apart projections, and a catch member pivoted between said projections and having a catch portion adapted normally to project above the body and engage in the openings of said disc, and said catch member being weighted to pivot the catch portion upwards to engage said disc, a means adapted normally to hold the lever in a retracted position, said lever having a handle projecting beyond said casing, the handle being movable from said retracted position to a terminal position whereby the disc is advanced forward the distance between successive pairs pairs of windows, a mounting panel based on said base member and arranged just beneath said disc, a catch member on said mounting panel adapted to engage said openings thereby to prevent the disc from moving in reverse direction, said casing including a cover member adapted to overlie said disc, a pair of viewing openings in the cover member adapted to register with said pairs of windows when the disc is in lever-terminal position, means for lighting the operative viewing openings operably by the movement of said lever.

6. An apparatus of the type described, comprising, a body assembly, a spindle extending upwards from said assembly, a viewer disc mounted on said spindle for rotation thereabout, a plurality of pairs of viewing openings in the disc, a transport lever pivotally mounted on the body assembly, the disc having a plurality of catch means at positions about it, the lever having a catch adapted to engage said catch means in turn, means normally adapted to hold the lever in retracted position, said lever having a handle projecting from the body assembly, the handle being movable from retracted position to a terminal position whereby the disc is advanced forward the distance from one pair of viewing openings to the next, a catch member on the body assembly adapted to engage said catch means on the disc in turn thereby to prevent the disc from moving in a reverse direction when a pair of viewing openings has been moved into viewing position, said body assembly having means overlying said disc, a pair of viewing openings in the means overlying the disc adapted to register in turn with the pairs of viewing openings in the disc when the disc is in lever-terminal position, the catch means on the body assembly having a body having a catch portion at one end and a weighting portion at the other and being pivoted adjacent the catch portion whereby the catch portion is urged upwardly to engage the catch means on said disc.

References Cited in the file of this patent

UNITED STATES PATENTS

| | | |
|---|---|---|
| 2,365,547 | Hausherr | Dec. 19, 1944 |
| 2,511,334 | Gruber | June 13, 1950 |

FOREIGN PATENTS

| | | |
|---|---|---|
| 683,292 | Germany | Nov. 3, 1939 |
| 459,113 | Italy | Aug. 25, 1950 |